US008922157B2

(12) United States Patent
Simonazzi

(10) Patent No.: US 8,922,157 B2
(45) Date of Patent: Dec. 30, 2014

(54) ELECTRIC BATTERY FOR VEHICLES

(75) Inventor: Giuseppe Simonazzi, Reggio Emilia (IT)

(73) Assignee: Meta System S.p.A., Reggio Emilia (IT)

( * ) Notice: Subject to any disclaimer, the term of this patent is extended or adjusted under 35 U.S.C. 154(b) by 411 days.

(21) Appl. No.: 13/501,761

(22) PCT Filed: Sep. 22, 2010

(86) PCT No.: PCT/IB2010/002366
§ 371 (c)(1),
(2), (4) Date: May 17, 2012

(87) PCT Pub. No.: WO2011/083361
PCT Pub. Date: Jul. 14, 2011

(65) Prior Publication Data
US 2012/0242278 A1    Sep. 27, 2012

(30) Foreign Application Priority Data

Oct. 15, 2009    (IT) .............................. MO2009A0250

(51) Int. Cl.
*H02J 7/00*    (2006.01)
*H01M 10/42*    (2006.01)
*H01M 2/34*    (2006.01)
*H01M 10/48*    (2006.01)

(52) U.S. Cl.
CPC .............. *H01M 10/42* (2013.01); *H01M 2/341* (2013.01); *H01M 10/48* (2013.01)

USPC ............ 320/106; 320/104; 320/107; 320/109

(58) Field of Classification Search
USPC .......... 320/104, 106–107, 109; 701/400, 408, 701/412, 468–470, 484–486; 726/34–36
See application file for complete search history.

(56) References Cited

U.S. PATENT DOCUMENTS

| | | | |
|---|---|---|---|
| 6,606,561 B2 * | 8/2003 | Flick | 701/484 |
| 6,611,755 B1 * | 8/2003 | Coffee et al. | 701/482 |
| 2004/0239502 A1 | 12/2004 | Yamauchi et al. | |
| 2010/0185357 A1 | 7/2010 | Mizumachi | |

FOREIGN PATENT DOCUMENTS

| | | |
|---|---|---|
| CN | 201 237 638 Y | 5/2009 |
| CN | 101 546 851 A | 9/2009 |
| KR | 10-2005-0010592 A | 1/2005 |
| WO | 03/098908 A1 | 11/2003 |
| WO | 2009/093705 A1 | 7/2009 |

OTHER PUBLICATIONS

International Search Report, dated May 6, 2011, from corresponding PCT application.

* cited by examiner

*Primary Examiner* — Nghia Doan
(74) *Attorney, Agent, or Firm* — Young & Thompson

(57) ABSTRACT

The electric battery for vehicles includes accumulation elements of electric charge connectable to the power supply line of a vehicle and electronic processing elements suitable for managing and/or controlling the use and the state of the battery.

16 Claims, 1 Drawing Sheet

ELECTRIC BATTERY FOR VEHICLES

TECHNICAL FIELD

The present invention relates to an electric battery for vehicles.

BACKGROUND ART

The need is known to manage and verify the use and the replacement of electric batteries on vehicles.

In particular, with reference to electric vehicles or so-called "hybrid" vehicles, batteries of modular type are known which, once exhausted, can be quickly changed with other already-charged batteries by appointed personnel, at a service station, at vehicle dealers or in other suitably equipped places.

This permits avoiding long vehicle down times for all the time normally required to complete battery recharging.

Consequently, the need is felt to implement new methods of management of the batteries used, e.g. through forms of free loan, and to implement new instruments that allow verifying and monitoring the actual use of the batteries themselves over time.

As is known, in fact, the free loan of goods in general envisages the use of appointed personnel with the specific duty of carrying out all the necessary preliminary checks before the goods are collected or delivered.

Generally speaking, several goods delivery or return points are dotted over an area and, in each of such points, the appointed personnel carries out all the necessary activities, such as, e.g., the compilation of the free loan requests by users, the assignment of the goods to the users, the checking of the identity of the users and of how long the goods are used, the authorization to collect and to deliver the goods.

The use of personnel for most of the operations therefore slows down and makes the goods delivery and collection procedures more complicated.

In case of the free loan of the batteries, on the other hand, it is of fundamental importance to speed up and simplify the collection procedures involving an exhausted battery and the delivery of a charged battery, so as to provide a service that is usable in the short term.

Both in the case of free loan and in other use situations, furthermore, the need is felt to conceive and implement new instruments that allow detecting the theft of the battery only, of the vehicle or, in any case, the unauthorised use of the battery itself.

In fact, the considerable cost of the batteries, in particular the cost of the batteries used on electrically-propelled vehicles, makes advisable the use of dedicated deterrent or anti-theft systems.

The document US 2004/239502 A1 discloses a storage battery that includes a burglary prevention device. Particularly, the burglary prevention device comprises a burglary sensor for detecting a burglar and a burglary prevention signal output unit.

However, also this known storage battery could be improved in order to obtain an enhanced detection of anomalous situations such as the theft of the vehicle or the unauthorised use of the battery.

DESCRIPTION OF THE INVENTION

The main aim of the present invention is to provide an electric battery for vehicles which allows achieving a better and quicker verification of the use and the conditions of the battery itself.

Another aim of the present invention is to provide an electric battery for vehicles that allows automating the collection and delivery procedures in the case of free loan.

Another aim of the present invention is to provide an electric battery for vehicles able to detect anomalous situations such as theft or unauthorised use.

Another object of the present invention is to provide an electric battery for vehicles which allows overcoming the mentioned drawbacks of the state of the art within the ambit of a simple, rational, easy and effective to use as well as low cost solution.

The above objects are achieved by the present electric battery for vehicles, comprising accumulation means of electric charge connectable to the power supply line of a vehicle, characterised by the fact that it comprises electronic processing means suitable for managing and/or controlling the use and the state of said battery.

BRIEF DESCRIPTION OF THE DRAWINGS

Other characteristics and advantages of the present invention will become more evident from the description of a preferred, but not sole, embodiment of an electric battery for vehicles, illustrated purely as an example but not limited to the annexed drawings in which.

EMBODIMENTS OF THE INVENTION

With particular reference to such figures, globally indicated by 1 is an electric battery for vehicles of the type usable on vehicles in general and, in particular, on electric vehicles or so-called "hybrid" vehicles.

Figure 1:
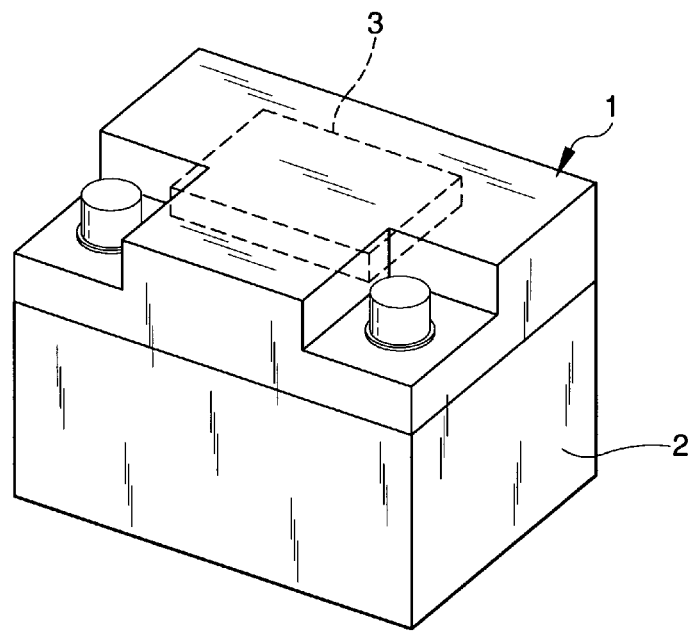
FIG. 1 is a schematic axonometric view of the battery according to the invention.

The battery 1 comprises accumulation means of electric charge, indicated generically in the FIG. 1 by the reference 2, made up of one or more accumulators of conventional type that can be connected to the power supply line of a vehicle.

The battery 1 also comprises electronic processing means, generally indicated in the figures by the reference 3, suitable for managing and/or controlling the use and the state of the battery itself.

The electronic processing means 3, in particular, are suitable for allowing a faster and better verification of the use and the conditions of the battery, e.g., in case of free loan or, also, to allow detecting anomalous situations such as theft or unauthorised use.

The battery 1, usefully, comprises a single container body that can be fixed, e.g., inside the engine compartment or in the boot of the vehicle and suitable for housing the accumulation means 2 and the electronic processing means 3.

Advantageously, the electronic processing means 3 comprise a communication unit 4 suitable for communicating with at least a remote processing unit C.

The communication unit 4 comprises one or more transmitters and/or receivers operating with protocols conventionally used in the field of mobile phones, such as, e.g., GSM, GPRS, UMTS or the like.

The communication unit 4 also comprises at least an antenna for the transmission/receiving of signals towards/from the remote processing unit C.

Alternatively, the communication unit 4 can be associated with one or more external antennas installed on the vehicle.

The remote processing unit C, usefully, can be equipped with an appropriate software program suitable for managing the information coming from the communication unit 4 and suitable for using such information, e.g., to manage the free loan of the battery 1 or to verify anomalous situations such as theft or an unauthorised use of the battery itself.

The unit C, furthermore, can be set up to verify the presence or not of communication with the communication unit 4 of the battery 1 by means, e.g., of sending and receiving appropriate verification signals.

Particular devices are in fact known for disturbing GSM signals or other mobile phone standards of second or third generation, which, if used during the theft of the battery or of the vehicle, allow blocking the alarm signal transmitted by means of the communication unit 4.

Such devices, in point of fact, emit a disturbance signal that operates within the spectrum of the frequencies used by mobile phone standards and which, therefore, superimposes on the alarm signal transmitted by the communication unit 4 towards the remote unit C.

Figure 2:
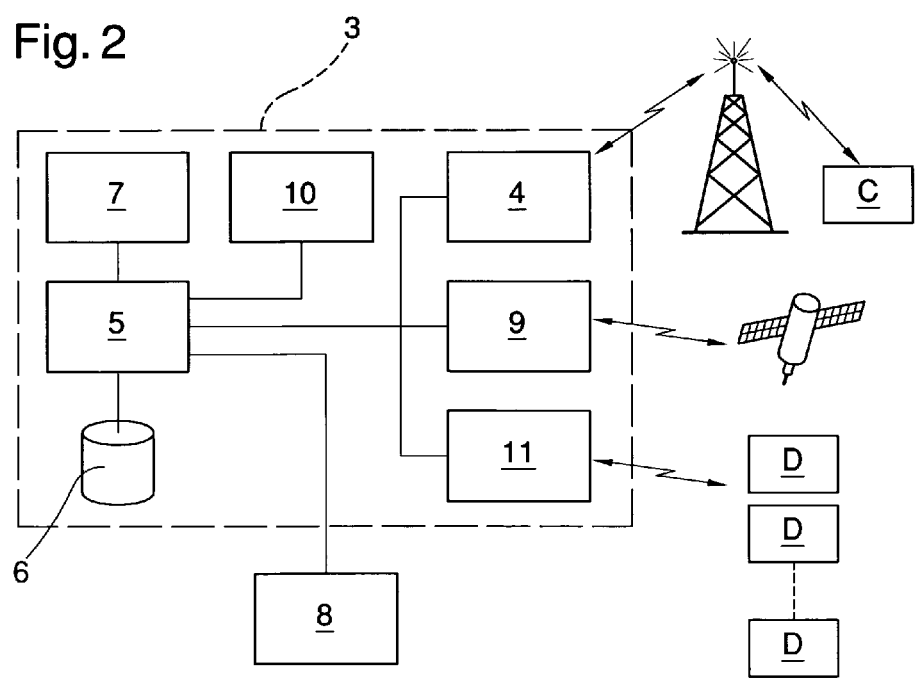
FIG. 2 is a functional diagram of the battery according to the invention.

The electronic processing means 3 comprise a management and control unit, generically indicated in FIG. 2 by the reference 5, which is made up, e.g., of a microprocessor or the like.

The management and control unit 5 is associated with the communication unit 4 and is suitable for managing the communication unit itself to send and receive information towards/from the remote processing unit C.

The electronic processing means 3, furthermore, comprise storage means 6, made up, e.g., of a re-writable type memory, suitable for storing information relating to the identification, the state and/or the use of the battery 1.

Usefully, the storage means 6 are suitable for storing an identification code of the battery 1 and/or an identification code of the vehicle.

The electronic processing means 3 can comprise verification means 7, made up of an appropriate software program managed by the management and control unit 5, suitable for verifying whether or not such codes are correct.

Alternatively, such codes, once sent by means of the communication unit 4, can be controlled by verification means present on the remote processing unit C and can be used to manage the free loan or to detect an unauthorised use of the battery 1.

Usefully, the management and control unit 5 can be connected to an anti-ignition device 8 of conventional type, outside the battery 1 and installed on the vehicle, suitable for communicating with the vehicle electronics to force the engine cut in the case of the verification means 7 detecting that at least one between the identification code of the battery 1 and the identification code of the vehicle is incorrect or, in any case, that the use of that particular battery 1 is not authorised.

The battery 1, furthermore, can comprise an interruption device, not shown in the figures, operatively associated with the management and control unit 5 and suitable for interrupting the connection between the accumulation means 2 and the vehicle power supply line in the case of the verification means 7 detecting that at least one between the identification code of the battery 1 and the identification code of the vehicle is incorrect, in the case of the unauthorised use of that particular battery 1 or in other cases of emergency.

Usefully, the electronic processing means 3 can comprise temporary disabling means for temporarily disabling the verification means 7, which can be enabled e.g. by means of a mechanical or electronic key insertable in an appropriate housing on the battery 1.

Such temporary disabling means can be used in emergency situations such as, e.g., in the case in which, in the vehicle transit area, devices are used to disturb the GSM signals or other mobile phone standards.

In this case, in fact, it would not be possible to send and/or receive, by means of the communication unit 4, the identification codes of the battery or of the vehicle towards the remote processing unit C and, consequently, this would inevitably lead to the cut of the vehicle engine by means of the anti-ignition device 8.

Usefully, the electronic processing means 3 can comprise a locating device for locating the position of the vehicle, generically indicated in FIG. 2 by the reference 9, associated with the management and control unit 5.

Alternatively, the electronic processing means 3, in particular the management and control unit 5, can be associated with a locating device of conventional type, outside the battery 1 and installed on the vehicle.

The locating device 9, in particular, comprises at least a satellite signal receiver of the type used in satellite navigation systems such as Global Positioning System (GPS), Galileo Positioning System or the like.

Usefully, the locating device 9 can be used to collect information on the position of the vehicle over time, then usable in case of free loan to perform tariffing on the basis of the actual use of the battery 1.

The locating device 9, furthermore, can be used to determine the position of the battery 1 in case of theft.

Inside the battery, the electronic processing means 3 also comprise a device for measuring the instantaneous acceleration/deceleration of the motor vehicle, generically indicated in FIG. 2 by the reference 10, made up, e.g., of a 3-axis accelerometer.

The accelerometer 10 can be used, e.g., to detect changes in the inclination of the battery or of the motor vehicle in case of any attempted theft or to detect how the vehicle is being driven by a user according to sudden accelerations or decelerations determined over time.

The electronic processing means 3 can also comprise a supplementary communication unit, indicated in FIG. 2 by the reference 11, suitable for communicating with at least an electronic device D installed on the vehicle.

The supplementary communication unit 11, in particular, can comprise means of transmission/receiving of signals by means of conveyed waves, through the vehicle power supply line.

Alternatively, the supplementary communication unit 11 can comprise means of transmission/receiving of radio-frequency signals towards/from one or more radio-frequency modules connected to respective electronic devices D.

The electronic processing means 3 can also comprise an electric connection port that can be connected to the conventional CAN (Controller Area Network) channel of the vehicle and, in this case, the supplementary communication unit 11 can comprise means of transmission/receiving of signals through such CAN channel.

The electronic devices D can be made up of any device installed on the vehicle and suitable for communicating with the electronic processing means 3, such as e.g., the anti-ignition device 8 or the locating device 9 if this is outside the battery 1.

During use, the electronic processing means 3 are suitable for detecting information relating to the state of the accumulation means 2, the position of the battery over time and information on the vehicle in general.

Such information is sent to the remote processing unit C where it is processed by a suitable software program suitable for performing, e.g., the management of the free loan of the battery 1 and/or checking anomalous situations such as the theft or an unauthorised use of the battery itself.

It has in point of fact been ascertained how the described invention achieves the proposed objects.

The presence of electronic processing means, in fact, allows achieving a more precise and quicker verification of the use and the conditions of the battery.

The electric battery according to the invention, furthermore, allows automating the collection and delivery procedures in case of free loan and determining anomalous situations such as theft or unauthorised use.

The invention claimed is:

1. Electric battery (1) for vehicles, comprising accumulation means (2) of electric charge connectable to the power supply line of a vehicle, and electronic processing means (3) suitable for managing and/or controlling the use and the state of said battery (1), wherein said electronic processing means (3) comprise a communication unit (4) suitable for communicating with at least a remote processing unit (C), comprising:
   verification means (7) of at least one between an identification code of said battery (1) and an identification code of said vehicle, wherein said electronic processing means (3) are associable with at least an anti-ignition device (8) of said vehicle suitable for forcing the engine cut off said vehicle in the case of said verification means (7) detecting that at least one between said identification code of the battery (1) and said identification code of the vehicle is incorrect and/or in the case in which it would not be possible to send and/or receive, by means of the communication unit (4), said identification codes of the battery or of the vehicle towards the remote processing unit (C);
   at least an electric connection port of said electronic processing means (3) and associable with a communication channel of said vehicle of the CAN (Controller Area Network) type;
   a supplementary communication unit (11) suitable for communicating with at least said anti-ignition device (8) and having means of transmission/receiving of signals through said communication channel.

2. Battery (1) according to the claim 1, wherein said communication unit (4) comprises at least a transmitter and/or a receiver operating with mobile phone protocols.

3. Battery (1) according to the claim 2, characterized by the fact that said mobile phone protocols are selected from the group comprising GSM, GPRS, UMTS or the like.

4. Battery (1) according to claim 1, wherein said communication unit (4) comprises at least an antenna for the transmission/receiving of at least a signal towards/from said remote processing unit (C).

5. Battery (1) according to claim 1, wherein said electronic processing means (3) comprise at least a management and control unit (5).

6. Battery (1) according to claim 1, wherein said electronic processing means (3) comprise storage means (6) for storing at least one between an identification code of said battery (1) and an identification code of said vehicle.

7. Battery (1) according to claim 6, wherein it comprises at least an interruption device operatively associated with said electronic processing means (3) and suitable for interrupting the connection between said accumulation means (2) and the power supply line of said vehicle in the case of said verification means (7) detecting that at least one between said identification code of the battery (1) and said identification code of the vehicle is incorrect.

8. Battery (1) according to claim 7, wherein said supplementary communication unit (11) is suitable for communicating with at least said interruption device.

9. Battery (1) according to claim 1, wherein said electronic processing means (3) comprise at least a locating device (9) for locating the position of said vehicle.

10. Battery (1) according to claim 9, characterized by the fact that said locating device (9) comprises at least a satellite signal receiver.

11. Battery (1) according to claim 9, wherein said supplementary communication unit (11) is suitable for communicating with at least said locating device (9).

12. Battery (1) according to claim 1, characterized by the fact that said electronic processing means (3) are associable with at least a locating device (9) for locating the position of said vehicle.

13. Battery (1) according to claim 1, wherein said electronic processing means (3) comprise at least a device for measuring the instantaneous acceleration/deceleration (10) of said vehicle.

14. Battery (1) according to the claim 1, wherein said supplementary communication unit (11) comprises means of transmission/receiving by means of conveyed waves, through said vehicle power supply line.

15. Battery (1) according to the claim 1, wherein said supplementary communication unit (11) comprises means of transmission/receiving of radio-frequency signals towards/from at least a radio-frequency module associated with said electronic device (D).

16. Battery (1) according to the claim 1, comprising at least a container body associable with said vehicle and suitable for housing at least said accumulation means (2) and said electronic processing means (3).

* * * * *